US010898957B2

(12) United States Patent
Tanabe et al.

(10) Patent No.: US 10,898,957 B2
(45) Date of Patent: Jan. 26, 2021

(54) PRODUCTION APPARATUS AND PRODUCTION METHOD FOR FINE PARTICLES

(71) Applicant: Panasonic Intellectual Property Management Co., Ltd., Osaka (JP)

(72) Inventors: Masaaki Tanabe, Hyogo (JP); Hisao Nagai, Osaka (JP); Takeshi Koiwasaki, Osaka (JP); Takafumi Okuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 384 days.

(21) Appl. No.: 15/922,838

(22) Filed: Mar. 15, 2018

(65) Prior Publication Data

US 2018/0304374 A1    Oct. 25, 2018

(30) Foreign Application Priority Data

Apr. 19, 2017    (JP) ................... 2017-083154

(51) Int. Cl.
*B22F 9/14*        (2006.01)
*B01J 19/08*       (2006.01)
(Continued)

(52) U.S. Cl.
CPC .............. *B22F 9/14* (2013.01); *B01J 19/088* (2013.01); *B22F 1/0018* (2013.01);
(Continued)

(58) Field of Classification Search
None
See application file for complete search history.

(56) References Cited

U.S. PATENT DOCUMENTS 4,696,855 A * 9/1987 Pettit, Jr. ................. B05B 7/226
                                                428/312.8
5,298,714 A * 3/1994 Szente ................. B23K 10/006
                                                118/308
(Continued)

FOREIGN PATENT DOCUMENTS

JP    2015-205247    11/2015
JP    2016-068058     5/2016
(Continued)

OTHER PUBLICATIONS

English Translation of KR 20170035138 (originally published Mar. 30, 2017), from Espacenet.*

*Primary Examiner* — George Wyszomierski
(74) *Attorney, Agent, or Firm* — Wenderoth, Lind & Ponack, L.L.P.

(57) ABSTRACT

A production apparatus and method for fine particles are capable of increasing a production amount and producing fine particles at low cost by efficiently inputting a large amount of material to plasma. The production apparatus includes a material supply device, which includes a plurality of material supply ports that supply a material gas containing material particles and are arranged below a plurality of electrodes in a vertical direction inside a vacuum chamber. The material supply device further includes a first gas supply port that supplies a first shield gas arranged in an inner periphery of the plural material supply ports and plural second gas supply ports that supply a second shield gas arranged in an outer periphery of the plural material supply ports.

13 Claims, 3 Drawing Sheets

(51) Int. Cl.
    *C01B 33/021*     (2006.01)
    *B22F 1/00*     (2006.01)
    *C01B 32/956*     (2017.01)
    *B22F 9/16*     (2006.01)

(52) U.S. Cl.
    CPC .......... *C01B 32/956* (2017.08); *C01B 33/021* (2013.01); *B01J 2219/0813* (2013.01); *B01J 2219/0822* (2013.01); *B01J 2219/0839* (2013.01); *B01J 2219/0841* (2013.01); *B01J 2219/0869* (2013.01); *B01J 2219/0871* (2013.01); *B01J 2219/0875* (2013.01); *B01J 2219/0894* (2013.01); *B22F 9/16* (2013.01); *B22F 2201/013* (2013.01); *B22F 2201/11* (2013.01); *B22F 2201/20* (2013.01); *B22F 2202/13* (2013.01); *B22F 2301/10* (2013.01); *B22F 2301/15* (2013.01); *B22F 2301/255* (2013.01); *B22F 2304/05* (2013.01); *B22F 2998/10* (2013.01); *B22F 2999/00* (2013.01); *C01P 2004/64* (2013.01)

(56) References Cited

U.S. PATENT DOCUMENTS

6,379,419 B1*     4/2002     Celik .................... B01J 12/002
                                                                            75/346
2016/0207113 A1     7/2016     Nagai et al.
2017/0136546 A1     5/2017     Nagai et al.

FOREIGN PATENT DOCUMENTS

JP         2016-131935         7/2016
KR        20170035138 A   *   3/2017

* cited by examiner

PRODUCTION APPARATUS AND PRODUCTION METHOD FOR FINE PARTICLES

TECHNICAL FIELD

The technical field relates to a production apparatus and a production method for fine particles, which are used for, for example, a coating material such as on a film material of food packaging or an ink raw material used for electric apparatus wiring and so on.

BACKGROUND

In recent years, nanometer sized fine particles have been widely used in various fields such as electronic materials, ink and cosmetics.

A variety of fine particles are used according to the applications. For example, fine particles of a Si material and the like are used for electronic materials and fine particles of $TiO_2$ and the like are used for ink or cosmetics.

Three typical methods of producing nanometer sized fine particles are a solid-phase reaction method, a liquid-phase reaction method and a gas-phase reaction method.

In the gas-phase reaction method, a space in a high energy state is made by laser or plasma, and particles to be a material or a gas containing particles are supplied to the space. Accordingly, the material is condensed and solidified by being evaporated and cooled again, thereby producing fine particles with high purity. The gas-phase reaction method has a feature that particle diameter distribution of fine particles is easily controlled as compared with other two kinds of methods listed above.

As a production method for fine particles in nanometer size by the gas-phase reaction method, for example, in JP-A-2016-131935 (Patent Literature 1), there is disclosed a method in which high-temperature arc discharge by arc discharge from electrodes connected in a vacuum chamber is generated, particles to be a material are fed into the arc discharge from a supply device and are evaporated and cooled to thereby produce fine particles in nanometer size.

Also in Patent Literature 1, a structure in which a plurality of material supply ports are provided at angles at the time of supplying the material and these ports are rotated by motor is described. Accordingly, it is possible to suppress a phenomenon in which particles to be the material are supplied to the same place at the time of supplying the material and the temperature of plasma is reduced. As a result of the temperature drop, particle diameter distribution of the produced fine particles is widened. When this phenomenon is suppressed, fine particles can be produced more efficiently.

However, in the case where fine particles are produced by using the above production apparatus for fine particles in related art (see FIG. 1 of Patent Literature 1), the supply ports of a material gas are provided only in the vicinity of the center of a plasma generation region, therefore, the temperature of plasma is reduced due to particles continuously supplied when a flow velocity of the material gas to be supplied is increased to thereby improve production efficiency. As a result, the width of particle size distribution of fine particles is widened after the plasma processing and sizes of particles become non-uniform, and further, processing efficiency is also reduced.

SUMMARY

An object of the present disclosure is to provide a production apparatus and production method for fine particles capable of increasing the production amount as well as producing fine particles at low cost by efficiently inputting a large amount of material to plasma in consideration of the above related-art problems.

In order to achieve the above object, a production apparatus for fine particles according to an aspect of the present disclosure includes a vacuum chamber, a material supply device connected to the vacuum chamber and supplying material particles, a plurality of electrodes connected to the vacuum chamber and generating plasma by arc discharge in a state where tip ends protrude into the vacuum chamber, AC power sources connected to respective electrodes, and a collection device connected to the vacuum chamber and collecting fine particles, which generates the arc discharge inside the vacuum chamber and produces fine particles from the material particles, in which a plurality of material supply ports of the material supply device that supply a material gas containing the material particles are arranged below the plurality of electrodes in a vertical direction inside the vacuum chamber, and a first shield gas supply port (first gas supply port) that supplies a first shield gas (first gas) is arranged in an inner periphery of the plural material supply ports of the material supply device and plural second shield gas ports (second gas supply ports) that supply a second shield gas (second gas) are arranged in an outer periphery of the plural material supply ports.

In order to achieve the above object, a production method for fine particles comprising the steps of generating arc discharge, supplying a material gas to the arc discharge, and generating fine particles by using the production apparatus for fine particles according to claim 5, in which, when the material gas is supplied to the arc discharge inside a vacuum chamber from a plurality of material supply ports of a material supply device, a first shield gas (first gas) is supplied into the vacuum chamber at a higher flow velocity than a flow velocity of the material gas, and a second shield gas (second gas) is supplied into the vacuum chamber at a lower rate than the flow velocity of the material gas.

According to the above aspects of the present disclosure, the plural material supply ports of the material supply device that supply the material gas containing the material particles are arranged below the plural electrodes in the vertical direction in the distributed matter in the vacuum chamber, and the first shield gas supply port (first gas supply port) is arranged in the inner periphery of the plural material supply ports of the material supply device and plural second shield gas ports (second gas supply ports) are arranged in the outer periphery of the plural material supply ports. According to the above structure, a large amount of material is efficiently supplied to a plasma region at tip end portions of the electrodes where the highest-temperature plasma is generated in the distributed matter, thereby increasing the amount of fine particles generated as well as producing the fine particles at low cost. That is, the plural material supply ports are arranged between the first shield gas supply port (first gas supply port) on the inner side and the second shield gas supply ports (second gas supply port) on the outer side, and the material gas can be supplied to plural places inside the arc discharge plasma from these plural material supply ports while being guided by the first shield gas (first gas) and the second shield gas (second gas) without being diffused to the outside of the arc discharge plasma region. As a result, the supply of the material gas into the arc discharge plasma can be distributed. Accordingly, local reduction in temperature of plasma can be suppressed and the material gas can be efficiently supplied to the high-temperature plasma region in the vicinity of electrodes in the distributed manner. It is also possible to suppress diffusion of the material to the outside of the arc discharge plasma generation region by introducing the shield gases (gases) respectively to the inner and outer peripheries of the material gas. As a result, according to the production apparatus and the production method for fine particles according to the above aspects, the production amount can be increased and fine particles can be produced at low cost by efficiently inputting a large amount of material to the plasma.

DESCRIPTION OF EMBODIMENTS

Hereinafter, embodiments of the present disclosure will be explained in detail with reference to the drawings.

Figure 1:
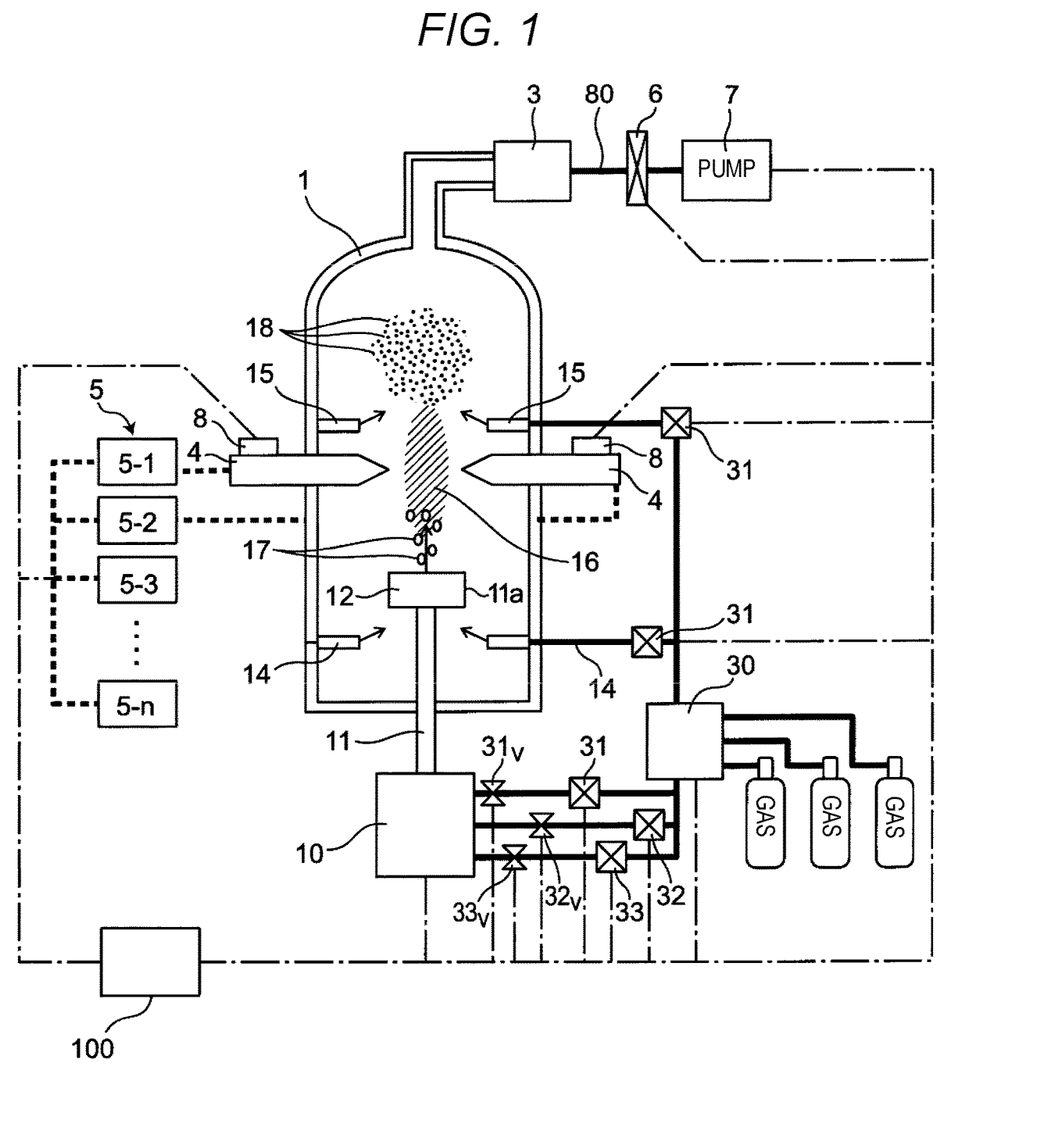
FIG. 1 is a schematic cross-sectional side view of a production apparatus for fine particles according to a first embodiment of the present disclosure.
Figure 2:
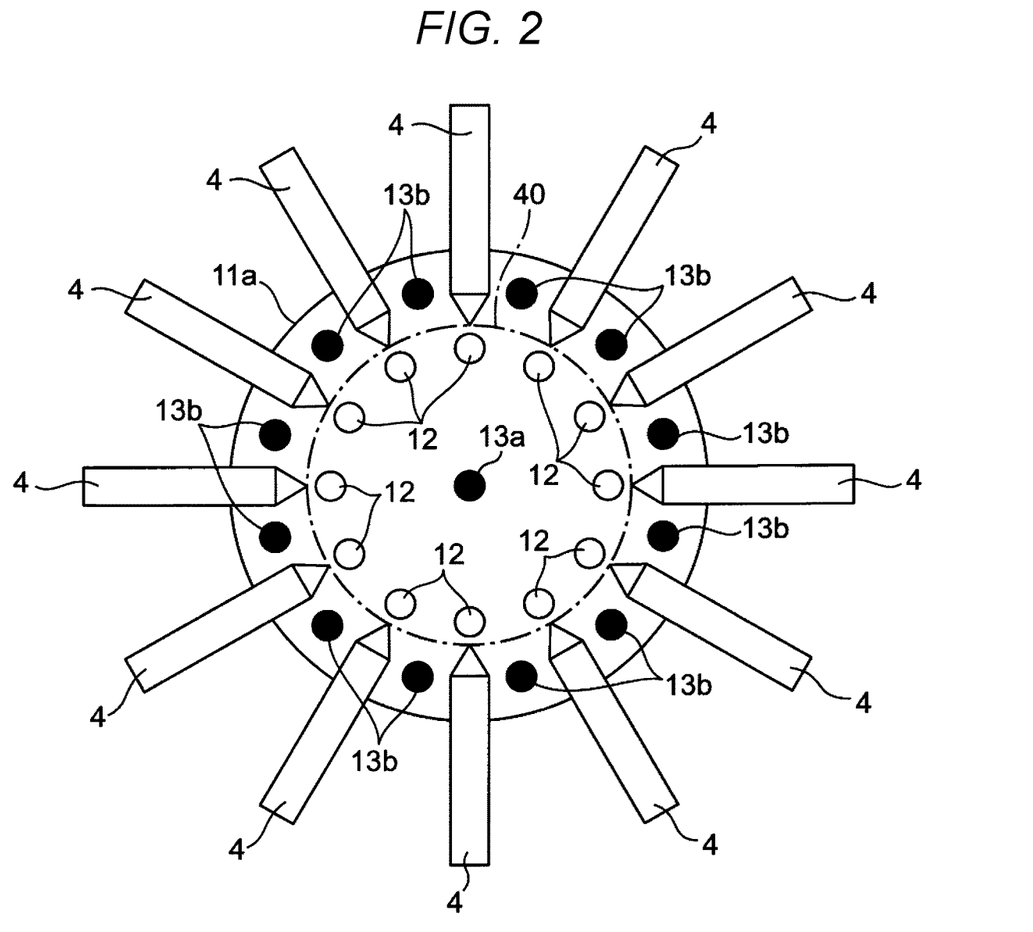
FIG. 2 is a schematic plan view of supply ports of the production apparatus for fine particles according to the first embodiment of the present disclosure.
Figure 3:
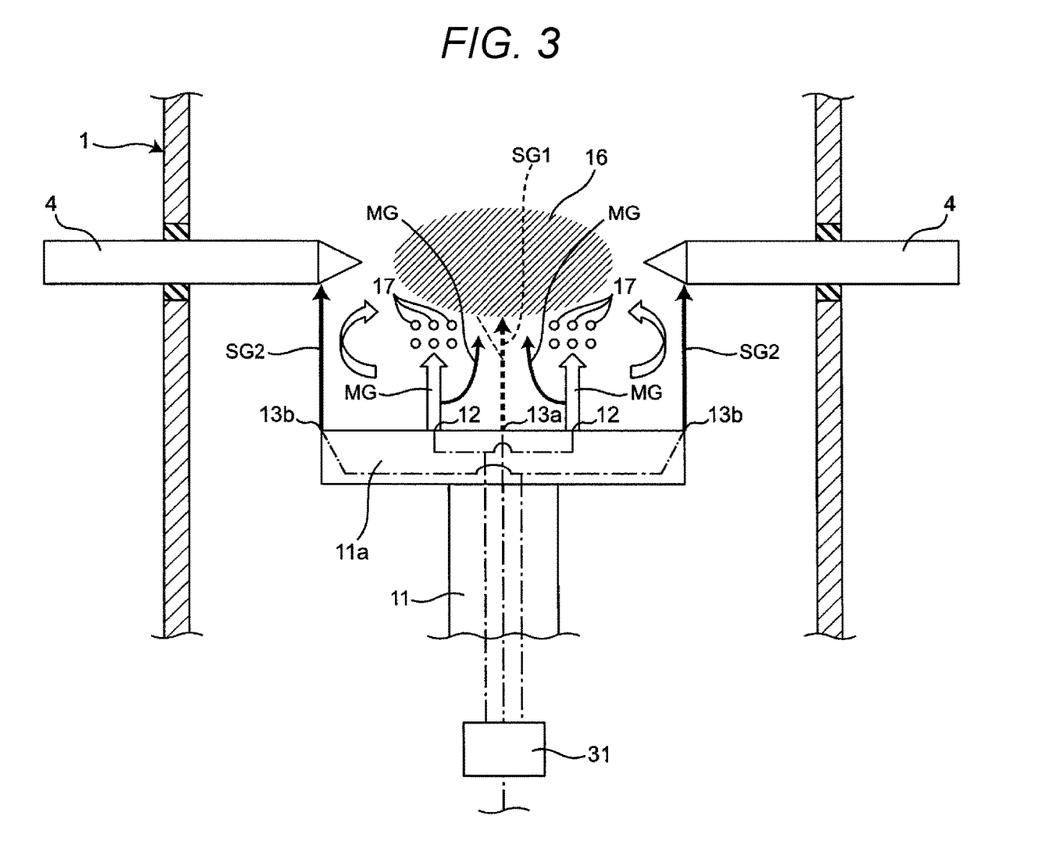
FIG. 3 is an enlarged cross-sectional side view in the vicinity of supply ports of the production apparatus for fine particles according to the first embodiment of the present disclosure.

FIG. 1 shows a schematic cross-sectional side view of a production apparatus for fine particles according to a first embodiment of the present disclosure. FIG. 2 shows a schematic plan view of supply ports of the production apparatus for fine particles according to the first embodiment of the present disclosure. FIG. 3 shows an enlarged cross-sectional side view in the vicinity of supply ports of the production apparatus for fine particles according to the first embodiment of the present disclosure.

First Embodiment

The production apparatus for fine particle according to the first embodiment includes at least a vacuum chamber 1, a material supply device 10, a plurality of upper electrodes 4, AC power sources 5 and a fine particle collection device 3, in which an arc discharge 16 is generated inside the vacuum chamber 1 and fine particles 18 are produced from material particles 17 as shown in FIGS. 1 and 2. An example of the vacuum chamber is a vacuum chamber 1.

An inner surface of a side wall of the vacuum chamber 1 having a not-shown water cooling mechanism inside the cylindrical side wall is covered with a heat insulating material formed of, for example, ceramic for transmitting heat of the arc discharge (plasma) to the material efficiently.

The material supply device 10 is connected to the vacuum chamber 1, supplying the material particles 17. The material supply device 10 is arranged below a bottom portion of the vacuum chamber 1, supplying the material particles 17 as a material gas MG from plural material supply ports 12 at an upper end portion 11a of a material supply pipe 11 by a carrier gas upward into the vacuum chamber 1.

The plurality of electrodes 4 are connected to the vacuum chamber 1, generating plasma by the arc discharge 16 in a state where respective tip ends protrude into the vacuum chamber 1 in a lateral direction (for example, along the horizontal direction). The electrodes 4 are respectively arranged above the material supply ports 12 so as to be arranged at given intervals. Specifically, the electrodes 4 are arranged so as to respectively cross (for example, to be orthogonal to) a direction in which the material particles 17 flow (for example, a direction from below to above) between the vicinity of the material supply ports to the fine particle collection device 3. As an example, the electrodes 4 made of carbon or metal for generating the arc discharge 16 may be arranged so that twelve electrodes 4 are radially arranged at intervals of 30 degrees on a circumferential wall of the vacuum chamber 1 in the state where tip ends thereof protrude in the lateral direction inside the vacuum chamber 1 as shown in FIG. 2. As an example, the electrodes 4 are formed of metal electrodes, and evaporation of the metal electrodes is reduced by water cooling and by allowing the cooling gas to flow therein so that a metal material is not mixed as an impurity of the fine particles 18 to be produced. A tungsten electrode as a high-melting point metal can be used as an example of the material for the electrodes 4, and electrodes made of other high-melting point metals such as tantalum or carbon material may be used instead of the tungsten electrode. As an example, the electrodes 4 are arranged so that tip ends thereof are inside one plane perpendicular to the vertical direction. The twelve electrodes 4 are radially arranged in the first embodiment, however, it is possible to increase the number of electrodes or to arrange electrodes in increased stages such as in two or three stages in addition to the arrangement on the same plane as long as the number of electrodes is a multiple of 6. When the electrodes 4 are arranged in multiple stages, the arc discharge as a heat source for evaporating the material particles can be further expanded in the vertical direction, which is predominant for producing a large amount of fine particles. Though the carbon electrodes are used as an example of the material for the electrodes 4 so that the arc discharge is easily generated, metal electrodes formed of a high-melting point metal such as tungsten or tantalum may be used. When the metal electrode is used as the material for the electrodes 4, it is preferable to provide a mechanism capable of cooling metal electrodes by water cooling or by allowing the cooling gas to flow so that the material of the metal electrodes is not mixed with generated fine particles by being evaporated or so that the material does not form an alloy by reacting with generated fine particles.

AC power sources 5 having n-pieces ("n" is an integer of 2 or more, for example, when twelve electrodes are arranged, n=12) of AC power sources 5, specifically, a first AC power source 5-1, a second AC power source 5-2, a third AC power source 5-3, . . . an n-th AC power source 5-n are connected, and an AC voltage of 60 Hz phases of which are shifted respectively by 30 degrees is applied to the plural electrodes 4 respectively from the AC power sources 5 to thereby generate the arc discharge 16 as arc discharge.

The respective electrodes 4 are independently movable that retract and advance in directions of radial lines with respect to the center of the vacuum chamber 1 by electrode drive devices 8 formed by a motor or the like. Accordingly, when the arc discharge is ignited, the respective electrodes 4 are moved to the center side of the vacuum chamber 1 by the electrode drive devices 8 until tip ends of the electrodes 4 contact one another. After the arc discharge is ignited, the electrodes 4 are moved in directions of radial lines (directions toward the outside from the central position of the electrodes radially arranged) by the electrode drive devices 8 while performing adjustment so that electric current applied to respective electrodes becomes constant, and tip ends of the electrodes 4 are moved away to the vicinity of the wall. Accordingly, the area of the arc discharge where arc discharge of approximately 10000° C. occurs is increased and a processing amount can be increased. As the electrode drive devices 8, ball screws are rotated normally and reversely by motors to thereby advance and retract the electrodes 4 connected to nut members screwed to the ball screws in an axial direction.

The fine particle collection device 3 is connected to the vacuum chamber 1 and collects the fine particles 18. The fine particle collection device 3 is arranged so as to be connected at an upper end of the vacuum chamber 1, which is exhausted by a pump 7 through a pipe 80 to collect the fine particles 18 generated in the vacuum chamber 1.

The production apparatus for fine particles further includes discharge gas supply pipes 14 supplying an atmosphere gas (discharge gas) for performing plasma discharge and cooling gas supply pipes 15.

The discharge gas supply pipes 14 are plural discharge gas supply pipes on a lower side of the vacuum chamber 1 and are radially arranged below the material supply ports 12 at given intervals around a central axis of the vacuum chamber 1 so as to supply the discharge gas toward the center of the vacuum chamber 1. Specifically, openings of respective discharge gas supply pipes 14 are arranged on a lower side of the vacuum chamber 1 than the material supply port 12, supplying the discharge gas from a gas supply device 30 through a gas flow-rate regulator 31 as an example of a flow-rate regulating device.

The cooling gas supply pipes 15 are plural cooling gas supply pipes on an upper side of the vacuum chamber 1, which are radially arranged above the electrodes 4 at given intervals around the central axis of the vacuum chamber 1 so as to supply a cooling gas toward the center of the vacuum chamber 1. Specifically, openings of respective cooling gas supply pipes 15 are arranged on an upper side of the reaction chamber 1 than the electrodes 4, supplying the cooling gas from the gas supply device 30 through the gas flow-rate regulator 31.

A controller 100 is respectively connected to the material supply device 10, the fine particle collection device 3, a pressure regulation valve 6, the exhaust pump 7, the gas supply device 30, the respective gas flow-rate regulators 31, later-described gas flow-rate regulators 32, 33 and throttles 31v, 32v and 33v, the AC power sources 5 and the respective electrode drive devices 8 so as to control respective operations.

The production apparatus for fine particles having the above structure is an apparatus that generates discharge inside the vacuum chamber 1 and produces the fine particles 18 from the material particles 17.

The material supply device 10 has the plural material supply ports 12 as described above, and the plural material supply ports 12 are arranged vertically below the plural electrodes 4. All the plural material supply ports 12 are arranged on an inner side of a circumference 40 connecting inside tip ends of the electrodes 4 when seen from above (in plan view), for example, on the circumference, so that the material particles 17 are supplied as a material gas MG by the carrier gas from respective material supply ports 12. Accordingly, the material is supplied from the material supply device 10 toward positions on the inner side of the circumference 40 connecting tip end portions of the electrodes.

Moreover, when seen from vertically above, a first shield gas supply port 13a as one first gas supply port is arranged at, for example, the center on the inner peripheral side of the plural material supply ports 12 of the material supply device 10, and a first shield gas SG1 as a first gas is supplied to the inside of the plural material supply ports 12 from the first shield gas supply port 13a. Also when seen from vertically above, second shield gas supply ports 13b as plural second gas supply ports are arranged on, for example, the circumference on the outer peripheral side of the plural material supply ports 12 of the material supply device 10, and a second shield gas SG2 as a second gas is supplied from the second gas supply ports 13b. As an example, argon gas or the like may be used as the first and second shield gases SG1, SG2 and the carrier gas, which can be supplied from the gas supply device 30 through the gas flow-rate regulators 31, 32 and 33. Here, the sum total of three gas flow-rate regulators 31, 32 and 33 as frequency modulation units are arranged so as to correspond to the material gas MG, the first shield gas SG1 and the second shield gas SG2 respectively. As shown in FIG. 1, the throttles 31v, 32v and 33v are arranged so as to correspond to these gas flow-rate regulators 31, 32 and 33 as well as three gas cylinders are connected to the gas supply device 30 so as to correspond to the arrangement.

Furthermore, as shown in FIG. 2 and FIG. 3, the second shield gas supply ports 13b of the material supply device 10 are arranged at positions between the electrodes 4 on the outer peripheral side of arrangement positions of the plural material supply ports 12, and the second shield gas SG2 is supplied from respective second shield gas supply ports 13b toward an upper part in the vacuum chamber 1. The second shield gas SG2 is regulated by the gas flow-rate regulators 31, 33 and the throttles 31v and 33v so that a flow velocity becomes lower than that of the material gas MG. Here, the lower flow velocity means that the flow velocity of the second shield gas SG2 is reduced to be lower than the flow velocity of the material gas MG to be within 25% to 75% of the flow velocity of the material gas MG from perspectives for preventing the material gas MG from being taken into the second shield gas SG2 and for increasing productivity of particles.

Additionally, as shown in FIG. 2 and FIG. 3, one first shield gas supply port 13a of the material supply device 10 is also arranged at the position (for example, the center) on the inner peripheral side of arrangement positions of the plural material supply ports 12, and the first shield gas SG1 is supplied from the first shield gas supply ports 13a toward an upper part in the vacuum chamber 1. The first shield gas SG1 is regulated by the gas flow-rate regulators 31, 32 and the throttles 31v and 32v so that a flow velocity becomes higher than that of the material gas MG. Here, the higher flow velocity means that the flow velocity of the first shield gas SG1 is increased higher than the flow velocity of the material gas MG to be within 125% to 200% of the flow velocity of the material gas MG from perspectives for allowing the material gas MG to be taken into the first shield gas SG1 and for preventing the material gas MG from being taken too much.

The vacuum chamber 1 can be exhausted from the exhaust pump 7 through a filter of the fine particle collection device 3 for collecting the fine particles 18.

A production method for fine particles using the production apparatus for fine particles according to the structure includes at least three steps of generating the arc discharge 16, supplying the material particles 17 to the arc discharge 16 and generating the fine particles 18. These operations can be automatically performed by being controlled by the controller 100.

First, when the arc discharge 16 is generated, the AC power phases of which differ from one another is applied to the respective electrodes 4 from the AC power sources 5, thereby generating the arc discharge 16 inside the vacuum chamber 1.

Subsequently, when the material particles 17 are supplied to the arc discharge 16, the material particles 17 are supplied as the material gas MG to a region of the arc discharge 16 from the plural material supply ports 12 of the material supply device 10 as well as the first shield gas SG1 is supplied from the first shield gas supply port 13a inside the plural material supply ports 12 and the second shield gas SG2 is supplied from the plural second shield gas supply ports 13b outside the plural material supply ports 12. The supply of the material gas MG, the supply of the first shield gas SG1 and the supply of the second shield gas SG2 are performed at the same time.

Next, when the fine particles 18 are generated, the material particles 17 are evaporated or vaporized to be the material gas MG when passing through the region of the arc discharge 16, and the material gas MG is rapidly cooled at a moment when the material gas MG exits from the region of the arc discharge 16 to thereby generate the fine particles 18.

Hereinafter, the production method for fine particles will be explained in detail along a procedure which is actually performed.

First, the vacuum chamber 1, the fine particle collection device 3 and the material supply device 10 are exhausted by the exhaust pump 7 to be several 10 Pa in pressure, thereby reducing the influence of oxygen in the air.

Next, the gases are supplied to the material supply device 10, the discharge gas supply pipes 14 and the cooling gas supply pipes 15 respectively from the gas supply device 30 through the gas flow-rate regulators 31, 32 and 33 and the throttles 31v, 32v and 33v, regulating the pressure inside the vacuum chamber 1 by the pressure regulation valve 6 installed in the previous stage of the exhaust pump 7. The gas is supplied from a plurality of supply ports from the discharge gas supply pipes 14 on the lower side of the vacuum chamber 1.

The cooling gas supply pipes 15 on the upper side of the vacuum chamber 1 supply the cooling gas from a plurality of supply ports into the vacuum chamber 1, thereby efficiently cooling the gas evaporated and vaporized by the arc discharge 16 to control the particle diameter of the fine particles 18 to be produced.

As an example, argon is supplied into the vacuum chamber 1 as the discharge gas and the cooling gas from the gas supply device 30 through the discharge gas supply pipes 14 and the cooling supply pipes 15 respectively for producing fine particles of silicon to produce fine particles in an inert gas atmosphere of argon inside the vacuum chamber 1 in one example of the first embodiment. The inert gas is used as the discharge gas and the cooling gas in this case and, for example, argon is used for both gases. It is also preferable to mix hydrogen gas and a slight amount of carbonized gas with argon to be introduced into the vacuum chamber 1 from the gas supply device 30 through the discharge gas supply pipes 14 and the cooling gas supply pipes 15 for promoting the reduction of the material. In the case where the hydrogen gas is mixed with the argon, the temperature of the arc discharge is increased to be higher than the case using only argon, therefore, reduction in diameter of fine particles to be produced can be promoted.

Next, the arc discharge 16 (in other words, thermal plasma) is generated. As an example, twelve electrodes 4 made of metal for generating the arc discharge 16 are arranged the total twelve electrodes are radially arranged on the inner peripheral wall of the vacuum chamber 1 at intervals of 30 degrees in a state where tip ends protrude into the vacuum chamber 1 in the lateral direction as shown in FIG. 1 to FIG. 3.

The AC power phases of which are shifted is applied to these electrodes 4 from the AC power sources 5. As an example, the AC power of 60 Hz phases of which are shifted by 30 degrees is applied to twelve electrodes 4 respectively from twelve AC power sources 5-1, . . . , 5-12 to thereby generate the vertically long arc discharge 16 as arc discharge of approximately 10000° C.

When the arc discharge 16 is ignited after the AC power is applied, arbitrary two or three electrodes 4 are moved to the center side of the vacuum chamber 1 by the electrode drive devices 8. After the arc discharge 16 is ignited, electric current applied to respective electrodes 4 are regulated to be constant, and respective electrodes 4 are moved to directions of radial lines (directions toward the outside from the central position of the circle 40 formed by respective tip ends of respective electrodes 4 which are radially arranged) by the electrode drive devices 8 so that the electrodes 4 are respectively placed as desired positions.

Subsequently, after the arc discharge 16 is generated, supply of the material to be processed with respect to the arc discharge 16 is started. As an example, silicon powder having approximately 16 micrometers is used as the material particles 17 as a raw material for the fine particles 18, which is set inside the material supply device 10. Though the particles having 16 micrometers are used in the first embodiment, particles having particle diameters of 1 micrometer or more and 100 micrometers or less are evaporated and the fine particles in nanometer order can be produced depending on the plasma conditions. When materials having particle diameters larger than 100 micrometers are used, it is difficult to completely evaporate the material and fine particles 18 to be generated may be increased in size.

The material supply device 10 is formed by a partial fluidized-type powder supply device as an example. In the partial fluidized-type powder supply device, a supply amount of the material is controlled according to the flow velocity of an argon gas as an example of the carrier gas and a rotation speed of a vessel into which the material is introduced, thereby feeding the powder material to the material supply pipe 11 at a constant rate. As other examples of the material supply device 10, there are a surface copying-type powder feeder that controls a distance between the surface of the powder material and a nozzle by using laser or the like, a quantitative-type powder feeder that supplies a quantitative powder material into a groove from a hopper or the like and sucks the material by gas and other devices. Any type of power material supply device may be used, however, the types of powder material supply devices used depend on the amount of the powder material to be supplied, the kind or the particle diameter of the powder material.

The material particles 17 supplied as the material gas MG with the carrier gas from the material supply device 10 are fed to the material supply pipe 11 from the material supply device 10 and introduced into a generation region of the arc discharge 16 inside the vacuum chamber 1 from the plural material supply ports 12 as an example of the material supply ports 12. At the time of supplying the material gas MG, the first shield gas SG1 is supplied from the first shield gas supply port 13a at a higher flow velocity than the flow velocity of the material gas MG on the inner side of the region where the material gas MG is supplied and the material gas MG is taken into the inner side of positions of the material supply ports 12, as a result, diffusion of the material gas MG to the outside of the plasma generation region is suppressed. Also, at the time of supplying the material gas MG, the second shield gas SG2 is supplied form the shield gas supply ports 13*b* at a lower flow velocity than the flow velocity of the material gas MG, and the material gas MG is not taken into the outer side of positions of the material supply ports 12, which suppresses diffusion of the material gas MG to the outside of the plasma generation region.

The material particles 17 in the material gas MG introduced into the vacuum chamber 1 in the above state are evaporated or vaporized (hereinafter, typically referred to as "evaporation") when passing through the arc discharge 16 and becomes a material particle evaporation gas (fine particle generation gas). The material particle evaporation gas formed by the evaporation of the material particles 17 moves upward inside the vacuum chamber 1 by an upward current due to heat of the arc discharge 16 or the gas flow from the discharge gas supply pipes 14 and rapidly cooled by the cooling gas from the cooling gas supply pipes 15 at a moment when exiting from the arc discharge 16, thereby generating spherical fine particles 18.

In general, the temperature of plasma is deprived by evaporation of the material in the arc discharge 16 at a place where the material is supplied, therefore, the temperature of the arc discharge 16 at the place where the material is evaporated is reduced. In a case where the material is sequentially inputted to continuous discharge such as a common inductively-coupled plasma (ICP) torch in related art, the temperature of plasma is reduced by evaporation of the material, therefore, it is difficult to completely evaporate the material and fine particles 18 having a relatively large size are generated and an average particle diameter of the produced fine particles 18 is increased, as a result, distribution of particle diameters is deteriorated. There is no choice but to limit the input amount of material for producing fine particle 18 having a desired particle diameter and for improving the distribution of particle diameters of produced fine particles 18, which reduces the processing amount.

In response to the above, the arc discharge 16 generated by the plural electrodes 4 used in the first embodiment uses the AC power sources 5 capable of supplying the power phases of which differ from one another, for example, the power of 60 Hz phases of which are shifted respectively by 30 degrees as power sources for the plural electrodes 4 respectively. Accordingly, the discharge has a pulse shape, therefore, thermal plasma having a high temperature can be constantly generated as the arc discharge 16. Furthermore, the material can be supplied in a pulsed manner by combining with the above material supply method, therefore, influence of reduction in plasma temperature due to evaporation of the material can be reduced and the heat the arc discharge 16 can be utilized for evaporation of the material extremely efficiently. Accordingly, the increase in a processing amount at the time of manufacturing fine particles can be expected.

As high-temperature plasma such as the arc discharge 16 is a viscous gas, the material particles 17 are not introduced into the arc discharge 16 and are not processed if the material particles 17 have a certain velocity. In the present apparatus in which the material supply device 10 and the material supply ports 12 are arranged below the arc discharge 16 in the vertical direction and the material supply ports 12 are arranged on the inner side of the circumference 40 connecting tip ends of the electrodes 4 in which the material particles 17 are supplied from the lower side of the arc discharge 16 in the vertical direction, unprocessed material particles 17 repelled by the arc discharge 16 fall down to the vertically lower side due to gravity, which can be separated from the fine particles 18 positioned in an upper part of the arc discharge 16 and have been processed.

Lastly, the fine particles 18 generated by the arc discharge 16 are collected by the fine particle collection device 3 having an exhaust mechanism by the flow of gas supplied from the discharge gas supply pipes 14 as shown in FIG. 1. The fine particle collection device 3 is provided with a cyclone that can classify fine particles 18 having an arbitrary diameter or more and a bag filter that can collect desired particles. As there is a danger of ignition in the atmospheric pressure when the collected fine particles are taken out to the air, fine particles 18 are left under an atmosphere containing approximately 1% of the air for several hours and slowly oxidized, then, taken out to the air. Accordingly, surfaces of silicon fine particles 18 are oxidized by 1 or more and 2 or less nanometers, and the fine particles can be taken out safely. According to the above processes, silicon fine particles having diameters of 10 or more and 300 or less nanometers can be collected from the bag filter.

The method of producing fine particles of silicon (Si) in nanometer order has been explained in the first embodiment, however, it is also possible to produce fine particles 18 by using metals such as nickel (Ni), silver (Ag) or copper (Cu), inorganic materials such as glass ($SiO_2$), silicon nitride (SiN) and alumina ($Al_2O_3$) as materials for producing fine particles. It is also preferable to generate fine particles 18 of silicon monoxide ($SiO_x$: x=1 to 1.6), silicon nitride ($SiN_x$: x=0.1 to 1.3) or silicon carbide ($SiC_x$: x=0.1 to 1) by using silicon materials by allowing materials to react with the gas introduced into the vacuum chamber. Furthermore, the present disclosure can be utilized for generation of composite materials containing plural materials having a silicon core on the inner side and covered with alumina, silicon carbide or the like on the outer side.

According to the first embodiment, the plural material supply port 12 of the material supply device 10 are installed in a distributed manner below the plural electrodes 4 in the vertical direction in the inner side of the circumference 40 connecting tip ends of the plural electrodes 4 as well as the first shield gas supply port 13*a* is arranged in the inner periphery of the plural material supply ports 12 of the material supply device 10 and the plural second shield gas supply ports 13*b* are arranged in the outer periphery of the plural material supply ports 12 in the vacuum chamber 1. That is, the plural material supply ports 12 are arranged in the distributed manner between the first shield gas supply port 13*a* provided on the inner side and the plural second shield gas ports 13*b* provided on the outer side, therefore, the material gas MG can be supplied to plural places inside the arc discharge plasma 16 from these plural material supply ports 12 while the material gas MG is guided by the first shield gas SG1 and the second shield gas SG2 without being diffused to the outside of the arc discharge plasma region. As a large amount of material is efficiently supplied in the distributed manner into the plasma region in the electrode tip portions where the highest temperature plasma is generated, the amount of fine particles 18 generated can be increased as well as the production of fine particles 18 at low cost. Moreover, the unprocessed material and the generated particles 18 are separated, therefore, particle diameters of the fine particles 18 to be generated can be made uniform easily and the stable generation processing can be performed.

Also according to the first embodiment, the AC power sources 5 are respectively connected to the plurality of electrodes 4 to thereby generate the arc discharge 16, therefore, the area of plasma in which the material is evaporated can be increased as compared with other methods.

At the time of supplying the material gas MG, the second shield gas SG2 is supplied from the second shield gas supply ports 13b at a lower flow velocity than the flow velocity of the material gas MG in the outer region of the region where the material gas MG is supplied. As a result, the material gas MG is not taken into the second shield gas SG2 on the outer periphery, which can suppress the diffusion of the material gas MG to the outside of the plasma generation region.

Also at the time of supplying the material gas MG, the first shield gas SG is supplied from the first shield gas supply port 13a at a higher flow velocity than the flow velocity of the material gas MG in the inner region of the region where the material gas MG is supplied. As a result, the material gas MG is taken into the inner side of positions of the material supply ports 12 by increasing the flow rate of the first shield gas SG1 flowing in the inner periphery of the material gas MG. Consequently, it is possible to suppress the diffusion of the material gas MG to the outside of the plasma generation region.

The positions of the second shield gas supply ports 13b on the outer periphery are arranged on an outer side of the circumference 40 connecting tip ends of the electrodes 4 as well as between the electrodes 4 when the production apparatus for fine particles is seen from vertically above as shown in FIG. 2. The second shield gas SG2 supplied from the second shield gas supply ports 13b arranged between the electrodes 4 has the lower flow velocity than that of the material gas MG as described above. Accordingly, the material gas MG is not taken into the second shield gas SG2 in the outer periphery, which suppresses diffusion of the material gas MG to the outside of the plasma generation region.

The flow rates of the material gas MG, the first and second shield gases SG1 and SG2 on the inner and outer peripheries can be changed in stages by modulating frequencies in stages by the gas flow-rate regulators 31, 32 and 33. This means that, for example, the frequency is changed by 100 kHz per minute from a low frequency of 0 Hz to a high frequency of 1000 kHz. The contrary case also exists. As a result, the supply amount of gas is changed in a direction in which the flow rate is increased when the frequency is increased, and is changed in a direction in which the flow rate is reduced when the frequency is reduced. As the gas flow velocity is controlled by the frequency, variation in flow rate does not depend on the kind of gas. Accordingly, positions where the material gas MG is supplied inside plasma can be changed to be non-uniform, and the reduction in temperature of plasma due to the input of the material particles 17 to the same position in plasma can be suppressed. As a result, a large amount of material can be efficiently inputted to plasma, the production amount can be increased and the production can be achieved at low cost.

It is also possible to synchronize the timing of supplying material particles from respective material supply ports and the timing of supplying the shield gases by the flow rate regulating device such as the gas flow-rate regulators 31, 32 and 33. In this case, time intervals at which the material is supplied and time intervals at which the shield gases are supplied are synchronized by controlling frequencies by using the gas flow-rate regulators 31, 32 and 33. As a result, the diffusion of the material gas to the outside of the plasma generation region can be supplied. As the material gas or the shield gases are supplied by controlling frequencies, the idling time of the production apparatus for fine particles in the supply of material and plasma processing can be reduced and the productivity can be increased.

Arbitrary embodiments and modification examples in the above various embodiments or modification examples are suitably combined, thereby realizing effects given by respective examples. It is possible to combine embodiments with each other, to combine examples with each other and to combine an embodiment with an example as well as to combine different embodiments with each other as well as to combine features in embodiments with each other.

In the production apparatus and the production method for fine particles according to the aspects of the present disclosure, the generation amount of fine particles can be increased and production can be made at low cost by efficiently supplying a large amount of material to the high-temperature region of plasma, therefore, the present disclosure is useful for the production apparatus and the production method for fine particles used for devices requiring mass production such as an electrode for a battery or a ceramic capacitor.

What is claimed is:

1. A production apparatus for fine particles comprising:
 a vacuum chamber;
 plural electrodes connected to the vacuum chamber and generating plasma by arc discharge in a state in which tip ends of the electrodes protrude into the vacuum chamber;
 AC power sources connected to the electrodes, respectively, and configured to supply power to the respective electrodes so as to generate the arc discharge inside the vacuum chamber;
 a material supply device connected to the vacuum chamber and supplying material particles to a region of the arc discharge, the material supply device having plural material supply ports that supply a material gas containing the material particles, the material supply ports being arranged below the plural electrodes in a vertical direction inside the vacuum chamber;
 a collection device connected to the vacuum chamber and collecting fine particles produced from the material particles; and
 a first gas supply port that supplies a first gas arranged in an inner periphery of the plural material supply ports, and plural second gas supply ports that supply a second gas arranged in an outer periphery of the plural material supply ports.

2. The production apparatus for fine particles according to claim 1,
 wherein the plural material supply ports of the material supply device are arranged on an inner side of a circumference connecting tip ends of the plural electrodes.

3. The production apparatus for fine particles according to claim 1,
 wherein each second gas supply port is arranged between a corresponding pair of adjacent ones of the plural electrodes.

4. The production apparatus for fine particles according to claim 2, wherein the second gas supply ports are arranged on an outer side of the circumference connecting tip ends of the plural electrodes.

5. The production apparatus for fine particles according to claim 1, further comprising:
 a flow-rate regulating device connected to the material supply device and capable of regulating a flow rate of the material gas supplied from the material supply device and flow rates of the first and second gases supplied from the first and second gas supply ports, respectively.

6. The production apparatus for fine particles according to claim 1,
wherein a number of the plural electrodes is a multiple of 6.

7. The production apparatus for fine particles according to claim 1,
wherein the plural electrodes include tungsten.

8. The production apparatus for fine particles according to claim 1,
wherein the plural electrodes include tantalum.

9. The production apparatus for fine particles according to claim 1,
wherein the plural electrodes include carbon material.

10. A production method for fine particles comprising:
generating arc discharge;
supplying a material gas to the arc discharge;
generating fine particles by using the production apparatus for fine particles according to claim 5; and
during the supplying of the material gas to the arc discharge inside the vacuum chamber from the material supply ports, supplying the first gas into the vacuum chamber at a flow velocity which is higher than a flow velocity of the material gas, and supplying the second gas into the vacuum chamber at a flow velocity which is lower than the flow velocity of the material gas.

11. The production method for fine particles according to claim 10, wherein the flow velocity of the second gas is within 25% to 75% of the flow velocity of the material gas.

12. The production method for fine particles according to claim 10, wherein the flow velocity of the first gas is within 125% to 200% of the flow velocity of the material gas.

13. A production method for fine particles comprising:
generating arc discharge;
supplying a material gas to the arc discharge;
generating fine particles by using the production apparatus for fine particles according to claim 5;
during the supplying of the material gas to the arc discharge inside the vacuum chamber from the material supply ports, supplying the first gas into the vacuum chamber at a flow velocity which is higher than a flow velocity of the material gas, and supplying the second gas into the vacuum chamber at a flow velocity which is lower than the flow velocity of the material gas; and
synchronizing a timing of the supplying of the material gas and a timing of the supplying of the first gas and the second gas with each other by the flow rate regulating device.

* * * * *